United States Patent [19]

Watanabe

[11] Patent Number: 4,725,103
[45] Date of Patent: Feb. 16, 1988

[54] BRAKE SYSTEM WITH HYDRAULIC BOOSTER TYPE BRAKING HYDRAULIC PRESSURE GENERATOR

[75] Inventor: Namio Watanabe, Saitama, Japan

[73] Assignees: Akebono Brake Industry Co., Ltd., Tokyo; Akebono Research and Development Centre Ltd., Saitama, both of Japan

[21] Appl. No.: 890,073

[22] Filed: Jul. 24, 1986

[30] Foreign Application Priority Data

Jul. 25, 1985 [JP] Japan ................................ 60-164552
Jul. 26, 1985 [JP] Japan ................................ 60-165457

[51] Int. Cl.$^4$ .......................... B60T 8/88; B60T 8/44; B60T 8/50
[52] U.S. Cl. ..................................... 303/92; 303/114; 303/119
[58] Field of Search ................. 303/92, 113, 114, 115, 303/116, 117, 119; 188/181 A

[56] References Cited

U.S. PATENT DOCUMENTS

| | | | |
|---|---|---|---|
| 4,027,924 | 6/1977 | Kondo | 303/115 |
| 4,050,748 | 9/1977 | Belart | 303/115 |
| 4,212,501 | 7/1980 | Miyakawa | 303/119 |
| 4,523,792 | 6/1985 | Belart | 303/92 |

*Primary Examiner*—Andres Kashnikow
*Assistant Examiner*—Timothy Newholm

*Attorney, Agent, or Firm*—Toren, McGeady & Associates

[57] ABSTRACT

A brake system with a hydraulic booster type braking hydraulic pressure generator includes a hydraulic pressure control device for controlling pressure in a first brake channel of a hydraulic pressure source, the control depends on a force exerted on a brake pedal. A hydraulic pressure generating device generates the hydraulic pressure of a second brake channel proportional to the hydraulic pressure in the first brake channel; and a fail-safe fluid chamber is capable of generating fail-safe hydraulic pressure in response to the motion of a piston depending on the force exerted on the brake pedal. A switch valve device is interposed between the fail-safe fluid chamber and a reservoir opens while receiving the hydraulic pressure of the first brake channel during brake application; and a hydraulic cylinder device generates braking hydraulic pressure of the first brake channel by either the hydraulic pressure generated at the fail-safe fluid chamber or the hydraulic pressure of the hydraulic pressure control device. In addition, a first valve of a normally-open type is disposed between the output side of the hydraulic pressure control device and an input chamber formed at one end of the power piston; and a second valve is disposed between the input chamber and a reservoir, with the first and second valves controlled by a signal from a control circuit detecting a skidding state of the wheels of a vehicle.

5 Claims, 3 Drawing Figures

BRAKE SYSTEM WITH HYDRAULIC BOOSTER TYPE BRAKING HYDRAULIC PRESSURE GENERATOR

BACKGROUND OF THE INVENTION

Field of the Invention

This invention relates to a brake system having a hydraulic booster type braking hydraulic pressure generator and more particularly to a hydraulic booster which is arranged to ensure the brake system to be adequately fail-safe when one of two hydraulic pressure channels of the booster fails to operate.

Another aspect of the present invention relates to an automatic control system and more particularly to a system in which an antiskid control device is combined into one unified body with a hydraulic booster.

The conventional hydraulic boosters used for the brake systems of vehicles include the kind having two independently arranged braking hydraulic pressure channels. One of the two channels is arranged to be of the hydraulic booster type and the other to be of the ordinary master cylinder type. An example of this kind has been disclosed, for example, in U.S. Pat. No. 4,482,192.

It would be advantageous for the hydraulic booster of this kind to be arranged such that, in the event of an abnormality such as a failure of one of the two channels, the booster is capable of ensuring a sufficient braking force for the whole vehicle in that event and also capable of saving the vehicle operator from falling into a panicked state due to any abnormal brake pedal operating feeling that arises on the occasion of such an abnormality.

Meanwhile component devices of varied kinds have been proposed for use in the brake system of a vehicle, including a hydraulic booster for boosting a braking force, an antiskid control device for preventing a locked state of wheels from occurring during brake application, etc. Generally, these devices are individually arranged.

However, since they are to be used as components of one and the same brake system for a vehicle, appropriate combination of them into one unified body would advantageously facilitate assembly and mounting work on the vehicle, simplify the structural arrangement and enhance the performance of the system.

In combining a hydraulic booster and an antiskid control device into one unified body, however, it is conceivable, for increased safety of the braking hydraulic pressure system of a vehicle, to arrange the system to have two channels, one arranged to be operated by a hydraulic booster and the other to be normally operated with hydraulic pressure generated by a pushing force of a piston, and to utilize the hydraulic pressure obtained from a pressure accumulator of the hydraulic booster in accomplishing antiskid control over the latter channel which is normally operated. With the system arranged in this manner, however, if one of the two channels should come to fail to adequately operate, the other would be affected thereby.

This invention is aimed to attain the above-stated advantage. It is therefore an object of this invention to provide a hydraulic booster type braking hydraulic pressure generating device which has two independent braking hydraulic pressure channels and is capable of channels when the other comes to fail to operate.

It is another object of this invention to provide a hydraulic booster type braking hydraulic pressure generating device which is capable of preventing any abnormal increase in the pedalling stroke of the brake pedal even in case that one of braking hydraulic pressure channels comes to fail.

It is further another object of this invention to provide a brake system for a vehicle having a hydraulic booster and an antiskid control device combined into one unified body.

It is further another object of this invention to reduce the size of the whole system by virtue of the above-stated combination into one unified body.

It is a stated further another object of this invention to provide a brake system for a vehicle which is capable of retaining at least a given amount of a vehicle braking force on a vehicle even in the event of a failure of one channel of the brake system.

DETAILED DESCRIPTION OF THE INVENTION

The present invention will be described in detail referring to the accompanying drawings.

Figure 1:
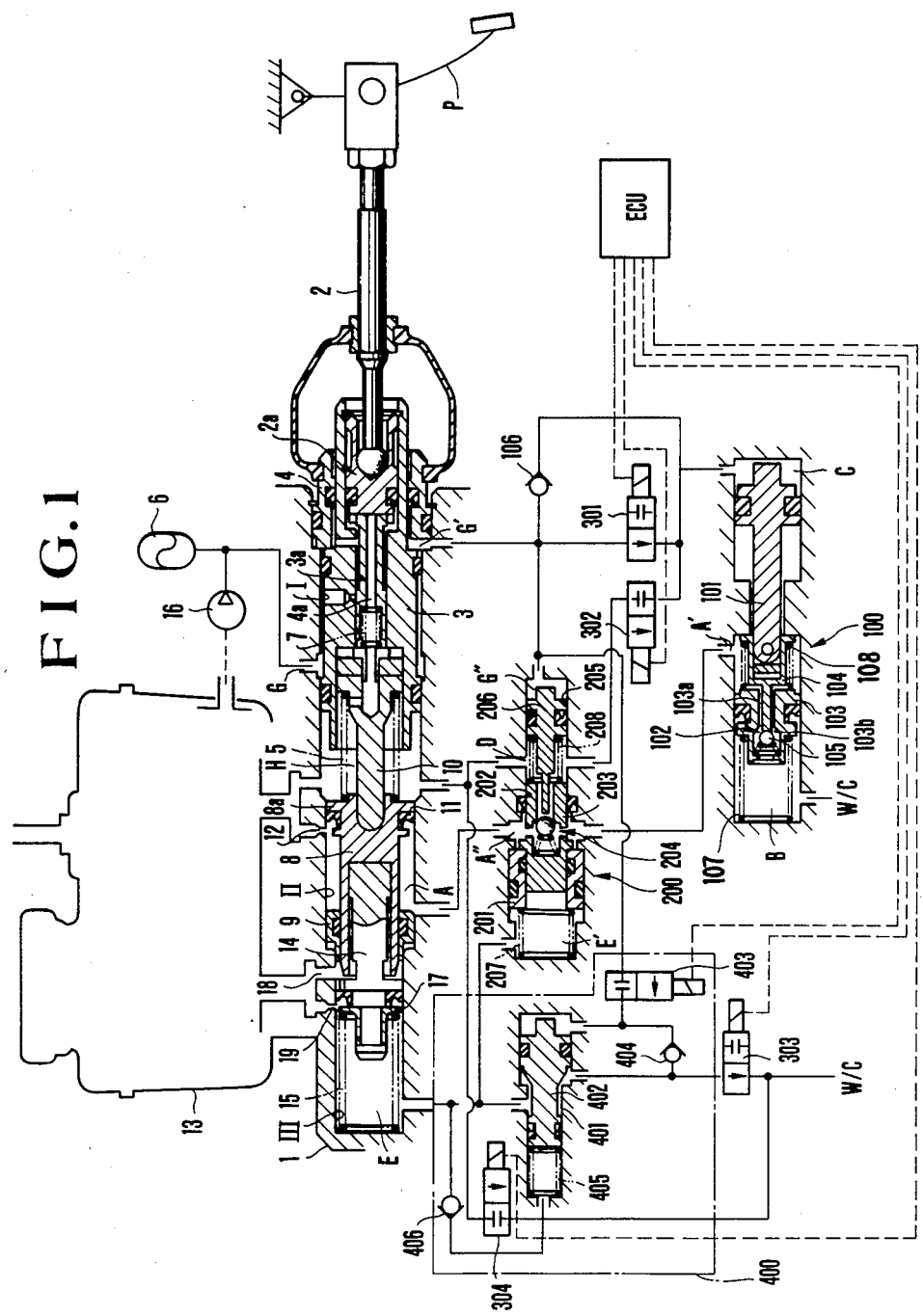
FIG. 1 is a sectional view showing in outline the arrangement of a brake system embodying this invention.

In FIG. 1, a cylinder body 1 comprises: From the right end (hereinafter referred to as the rear end) as viewed on the drawing, a first cylinder I which is arranged in a stepped shape to contain therein a control hydraulic pressure transmission device arranged as a part of a hydraulic booster arrangement for a first braking hydraulic pressure channel; a second cylinder II which contains therein a fail-safe hydraulic pressure generating device for generating fail-safe hydraulic pressure; and a third cylinder III which is arranged to contain a hydraulic pressure generating device for generating normal piston pushing hydraulic pressure to be used for a second braking hydraulic pressure channel. The first, second and third cylinders are coaxially arranged.

The inside of the first cylinder I is arranged as follows: A control piston 3 which has some fluid passage suitably formed therein is slidably engaged with the first cylinder. The piston 3 is pushed and biased by a return spring 5 toward an opening provided at the rear end (or right end as viewed on the drawing) of the cylinder. The piston 3 is provided with an inner cylinder 3a which is formed within the shaft part of the piston 3. A fluid passage change-over piston 4 is slidably engaged with the inside of the inner cylinder 3a. A push rod 2 is connected at its rear end to a brake pedal P. When the brake pedal is stepped down, the rod 2 pushes the change-over piston 4 to move.

The control piston 3 and the change-over piston 4 jointly form a control hydraulic pressure transmission device (hereinafter referred to as the booster for short). Under a non-braking condition, the booster is in a position as shown in FIG. 1. A boosting fluid chamber G' and a hydraulic pressure releasing fluid chamber H are allowed to communicate with each other via a passage 4a under this condition. When a pushing force of the push rod 2 comes to relatively push the change-over piston 4 into the control piston 3, the booster blocks the communication between the fluid chambers G' and H. This allows the boosting fluid chamber G' to communicate with a fluid chamber G disposed on the side of a pressure source. The fluid chamber G is connected to a pressure reservoir 6.

When hydraulic pressure is transmitted to the boosting fluid chamber G' with the chambers G' and G allowed to communicate with each other, a reacting rubber force which counteracts the pushing force of the push rod 2 acts on the change-over piston 4. This force acts on the brake pedal as a reaction to a pedalling force. Therefore, hydraulic pressure proportional to the pedalling force exerted on the brake pedal is transmitted from the chamber G to the chamber G'. Then, under that condition, the communication among the chambers G', G and H is blocked.

The arrangement of the inside of the first cylinder I described above may be made substantially in the same manner as the conventional method employed for the so-called hydraulic booster device. Further, the illustration of FIG. 1 includes a return spring 7 which is provided for the change-over piston 4. Next, a fail-safe hydraulic pressure generating device which is provided within the second cylinder II is arranged as described below:

Within the second cylinder II, a stepped fail-safe piston 8 is slidably arranged. The outer circumferential face of the fail-safe piston 8 and the end face of a large diameter flange 8a jointly define a fail-safe fluid chamber A. Further, the piston 8 is functionally connected to be moved together with the above-stated control piston 3 through a connecting or relay piston 10. A piston cup 11 which is fitted on the large diameter flange part 8a of the fail-safe piston 8 and a compensating port 12 which is formed in the cylinder body 1 are arranged to allow and block communication between the fluid chamber A and the inside of a reservoir 13. Under a non-braking condition which is as shown in FIG. 1, the fluid chamber A communicates with the inside of the reservoir 13. During brake application, the piston cup 11 closes the compensating port 12 to block this communication. By this, fail-safe hydraulic pressure which is dependent on the pushing force of the push rod 2 (or a pedalling force on the brake pedal) is generated within the fluid chamber A.

The inside of the third cylinder III is arranged as follows: A master cylinder type hydraulic pressure generating device which is arranged in a generally employed manner is disposed within the third cylinder III. A hydraulic pressure generating piston 14 is pushed and biased by means of a return spring 15 in such a way as to have its rear end engage the above-stated fail-safe piston 8.

Hydraulic pressure generated at a master cylinder fluid chamber E is arranged to be used as it is as the braking hydraulic pressure of a second braking hydraulic pressure channel. A pump 16 is arranged to suck up the fluid of the reservoir 13.

A pedal responding arrangement which is described in the foregoing has its various parts operate and generate hydraulic pressure as described below:

Under a non-braking conditon: The positional relation among various moving parts is as shown in FIG. 1 under a non-brake applying condition. The communication between the fluid chambers G' and G is blocked. The fluid chambers G' and H are respectively allowed to communicate with the reservoir. No hydraulic pressure is generated neither in the fail-safe fluid chamber A nor in the master cylinder fluid chamber E. The boosting fluid chamber G' also has no hydraulic pressure therein.

During brake application: Under this condition, communication is blocked between the fluid chambers G' and H and is allowed between the fluid chambers G' and G. Then, hydraulic pressure proportional to the pedalling force exerted on the brake pedal is transmitted to the boosting fluid chamber G'. Within the master cylinder fluid chamber E, there is generated a given amount of hydraulic pressure which is proportional to the pedalling force on the brake pedal. A switching valve device 200 which will be described later herein operates to release the hydraulic pressure of the fluid chamber A into the reservoir 13 under a normal braking condition.

As mentioned in the foregoing, the hydraulic pressure generated within the master cylinder fluid chamber E is the braking hydraulic pressure of the second braking hydraulic pressure channel. Meanwhile, the braking hydraulic pressure of the first braking hydraulic pressure channel is generated at a proportional hydraulic pressure generating device 100 (hereinafter referred to as the hydraulic cylinder device) which includes a power piston by transmitting the hydraulic pressure of the above-stated fluid chamber G'.

The hydraulic cylinder 100 comprises, in combination, a power piston 101 which is arranged to bring about braking pressure required for normal brake application; and a hydraulic piston 103 which contains therein a switch valve 102 and is arranged to generate braking hydraulic pressure in cooperation with the power piston 101 during normal brake application and to transmit the hydraulic pressure generated in the fluid chamber A to an applicable braking device in the event of a failure.

When the hydraulic pressure of the above-stated fluid chamber G is transmitted to a fluid chamber C, the above-stated power piston 101 is moved by the hydraulic pressure of the chamber C and is thus caused to impart a moving force to the hydraulic piston 103. The piston 103 is provided with a fluid passage 103a which axially pierces the piston 103, the switch valve 102 is of a check valve type and is arranged in the following manner: Under normal condition, a locking rod 104 abuts on a ball 105 to have the fluid passage 103a open by keeping the ball 105 away from a valve seat 103b. When the piston 103 is moved by the power piston with the power piston coming to push the extension part of the piston 103, the locking rod 104 is disengaged from the ball 105 to allow the ball 105 to come into contact with the valve seat 103b. The above-stated fluid passage is then closed by the ball 105.

One end part of the hydraulic piston 103 on the side of the power piston 101 confronts a fluid chamber A'. The fluid chamber A' communicates with the above-stated fail-safe fluid chamber A. The other end part of the hydraulic piston 103 confronts a fluid chamber B. The chamber B communicates with the wheel cylinder W/C of the braking device.

With the embodiment arranged as described above, when hydraulic pressure is transmitted to the fluid chamber C, the power piston 101 moves to push and move the hydraulic piston 103. Then, the movement of the piston 103 comes to close the switch valve 102. With the valve 102 thus closed, braking pressure which is for the second braking hydraulic pressure channel and is proportional to that of the fluid chamber C is generated in the fluid chamber B. Further, a reference numeral 107 denotes a return spring and another numeral 108 a holding spring for the locking rod.

Each of the first and second braking hydraulic pressure channels includes a hydraulic pressure supplying-and-discharging solenoid valve device which is arranged as described below:

The hydraulic pressure supplying-and-discharging solenoid valve device arranged in the first braking hydraulic pressure channel of this specific embodiment example comprises in combination: a normally-open type solenoid valve 301 which is provided in a passage between the fluid chambers G' and C; and a normally-closed type solenoid valve 302 which is provided in a passage for releasing the hydraulic pressure of the fluid chamber C into the reservoir 13. Meanwhile, the solenoid valve device of the second braking hydraulic pressure channel comprises in combination: a normally-open type solenoid valve 303 which is interposed in between the fluid chamber E and a braking device; and a normally-closed type solenoid valve 304 which is disposed in a passage provided for releasing hydraulic pressure from the inside of the braking device W/C into the reservoir 13.

The opening and closing operations of these solenoid valves of normally-open and normally-closed types are arranged to be performed under the control of an antiskid control circuit ECU. They are thus operated to reduce and increase the hydraulic pressure of the braking device in accordance with a known control method.

A fail-safe device which is disposed in the first braking hydraulic pressure channel is arranged as follows: The fail-safe device of this specific embodiment comprises the above-stated fail-safe fluid chamber A and a switching valve device 200 which is interposed in between the chamber A and the fluid chamber A' of a hydraulic cylinder device 100.

The switching valve device 200, in the case of this embodiment, comprises in combination: a cylindrical balance piston 201 which is arranged to slidably engage a large diameter cylinder and to have its two ends confronting fluid chambers E' and A"; a switching piston 203 which has one end thereof slidably engage the inner tubular part of the balance piston 201 and the other end slidably engage a cylinder 202 to come to confront a hydraulic pressure releasing fluid chamber D with the shaft part thereof passing through a fluid chamber A"; a one-way valve 204 which is disposed within this switching piston 203 and is arranged to open and close a passage provided between the fluid chamber A" and the fluid chamber D; and a locking rod piston 206 which slidably engages the inside of a cylinder 205 with the two ends thereof confronting the fluid chambers D and G" and is arranged to operate to open the one-way valve 204. Under a normal condition, the balance piston 201 is biased into a locked position on the side of the fluid chamber A" by a first set spring 207. The piston 201 thus prevents the movement toward a fluid chamber E' of the switching piston 203 which is being pushed by a second set spring 208. The locking rod piston 206 is biased toward a fluid chamber G" by the second set spring 208 which is disposed in between the piston 206 and the above-stated switching piston 203. By this, the one-way valve 204 is closed. Under this condition, therefore, communication between the fluid chambers A" and D is blocked. The fluid chamber A" is arranged to communicate with the fail-safe fluid chamber A and the fluid chamber A' of the hydraulic cylinder device 100. The fluid chamber E' is arranged to communicate with the master cylinder fluid chamber E while the fluid chamber G" is communicating with the boosting fluid chamber G'.

In the switching valve device 200 which is arranged as described above, the one-way valve 204 serves to release hydraulic pressure generated in the fail-safe fluid chamber A. The hydraulic pressure releasing action of this valve is arranged to be performed in the event that the hydraulic pressure of either the fluid chamber E' or G" fails to be transmitted during brake application. In other words, in case that both the fluid chambers E' and G" operate in a normal manner, the locking rod piston 206 moves to the switching piston 203 to disengage the ball of the one-way valve 204 from the valve seat. With the ball thus moved away from the valve seat, the fluid chambers A" and D come to communicate with each other so that hydraulic pressure can be released. If there is no hydraulic pressure in the fluid chamber E' on the other hand, the one-way valve 204 does not open as the switching piston 203 moves toward the chamber E'. Further, if there is no hydraulic pressure in the fluid chamber G", the one-way valve 204 also does not open as the locking rod piston 206 does not move.

In case that no hydraulic pressure is transmitted to the fluid chamber E', it means a failure of the second braking hydraulic pressure channel. No hydraulic pressure transmission to the fluid chamber G" means a failure of the hydraulic booster device of the first braking hydraulic pressure channel (normally a failure in power). In the event of each of these failures, the hydraulic pressure generated at the fail-safe fluid chamber A is transmitted to the fluid chamber A' of the hydraulic cylinder device 100 to ensure an adequate fail-safe operation.

The embodiment includes a gate valve device 400. In this specific example of embodiment of this invention, the gate valve device 400 comprises, in combination: a normally-open type gate valve 401 which is interposed in between the master cylinder fluid chamber E and a solenoid valve 303; a normally-closed type hydraulic pressure introducing solenoid valve 403 which is arranged to cause passage-closing-control hydraulic pressure of the fluid chamber G' to act on a piston 402 provided within the gate valve 401; and a one-way valve 404 which is arranged to allow introduced hydraulic pressure to be transmitted only toward the braking device. The piston 402 is normally biased to its initial position by the spring force of a set spring 405 to open a fluid passage. When the hydraulic pressure introducing solenoid valve 403 is opened in response to an instruction for starting antiskid control, the piston 402 acts to close the fluid passage. Therefore, the second braking hydraulic pressure channel transmits the hydraulic pressure of the master cylinder fluid chamber E to the braking device for a breaking action during normal brake application. In the event of the start of antiskid control, the second braking hydraulic pressure channel has the gate valve 401 closed with the hydraulic pressure introducing solenoid valve 403 opened. Under that condition, the hydraulic pressure within the master cylinder fluid chamber E does not fluctuate and, on the downstream side of the gate valve 401, a reducing-and-increasing control operation can be accomplished on braking hydraulic pressure with the solenoid valves 303 and 304 opened and closed as necessary.

Another one-way valve 406 is arranged in a by-pass passage for the purpose of returning the pressure fluid of the braking device back to the master cylinder fluid chamber E. A one-way valve 106 is provided in a by-pass passage for returning the hydraulic pressure of the fluid chamber C of the first braking hydraulic pressure chamber back to the boosting fluid chamber G'.

The following is a brief description of the operation of the hydraulic booster type hydraulic pressure generating device which includes the antiskid control arrangement of this embodiment example: During normal brake application, the braking hydraulic pressure of the first braking hydraulic pressure channel is generated by the power piston 101 provided within the hydraulic cylinder device 100 depending on the hydraulic pressure of the fluid chamber G'. Then, in the second braking hydraulic pressure channel, braking hydraulic pressure is generated at the master cylinder fluid chamber E. The hydraulic pressure thus obtained in each of these channels is transmitted to the applicable braking device W/C.

In the case of antiskid control, the braking hydraulic pressure within the fluid chamber C of the first braking hydraulic pressure channel is reduced, held and increased as necessary by means of the solenoid valves 301 and 302 for the antiskid control. Meanwhile, in the second braking hydraulic pressure channel, the gate valve 401 of the gate valve device 400 is first closed to block the communication between the master cylinder fluid chamber E and the braking device. After that, the hydraulic pressure introducing solenoid valve 403 opens to have the solenoid valves 303 and 304 opened and closed by means of hydraulic pressure introduced from the fluid chamber G', so that the antiskid control can be accomplished over the braking hydraulic pressure.

In the event of a failure of any one of the braking hydraulic pressure channels, the embodiment operates as follows: If it is the pressure accumulator of the first braking hydraulic pressure channel that fails, no hydraulic pressure is transmitted to the fluid chamber C and thus no hydraulic pressure is generated within the hydraulic cylinder device 100. However, with the one-way valve 204 closed, the switching valve 200 transmits the fail-safe hydraulic pressure which is generated within the fluid chamber A of the fail-safe hydraulic pressure generating device to the fluid chamber A'. Then, the fail-safe hydraulic pressure is further transmitted via the valve 102 which is open to the braking device W/C of a first braking system. Further, the second hydraulic pressure channel produces braking hydraulic pressure in the same manner as under a normal condition as long as it remains in a normal state. In the event that the second hydraulic pressure channel also fails concurrently with the first channel, the fail-safe hydraulic pressure of the first braking hydraulic pressure channel can be secured for use as braking hydraulic pressure.

If a part of the first braking hydraulic pressure channel on the side of the braking device comes to fail, the second braking hydraulic pressure channel generates and transmits braking hydraulic pressure in a normal manner. Further, since the pressure accumulator is in a normal state, the antiskid control also can be accomplished in a normal manner.

In the event of a failure of the second braking hydraulic pressure channel, the embodiment operates as follows: During normal brake application under that condition, braking hydraulic pressure is generated and transmitted in and from the first hydraulic pressure channel in the normal manner. In the case of antiskid control, the failure of the second hydraulic pressure channel is detected by suitable detecting means, such as a combination of a pressure switch and a brake pedalling detection switch or the like. Then, the change-over operation from a closed state to an open state of the hydraulic pressure introducing solenoid valve 403 of the gate valve device 400 is cancelled to ensure that antiskid control can be accomplished in the normal manner in the first braking hydraulic pressure channel. Even if the cancellation of the operation of the hydraulic pressure introducing solenoid valve 403 delays thus causing a leak of hydraulic pressure of the fluid chamber G', i.e. the pressure accumulator 6, the hydraulic pressure can be transmitted from the fail-safe fluid chamber A to the fluid chamber A', so that the vehicle can be saved from falling into a state of having absolutely no braking force available.

This invention is not limited to the specific embodiment described. Various modifications and changes may be made in the arrangement of the component parts without departing from the spirit of the invention. For example, the balance piston 201 which is arranged within the switching valve device to equalize the braking hydraulic pressure of the first and second braking hydraulic pressure channels in the event of a failure of power of the first braking hydraulic pressure channel may be replaced with a balancing device arranged separately from the switching valve device.

Figure 2:
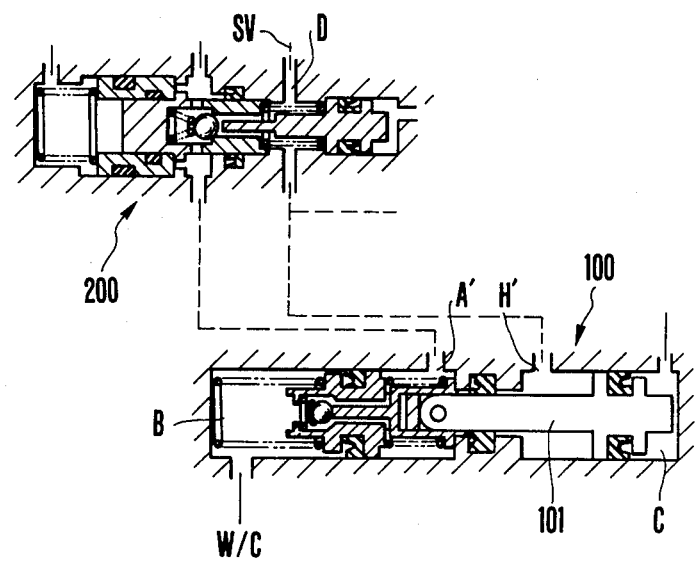
FIG. 2 is a sectional view showing a portion of another embodiment of this invention.

Further, referring to FIG. 2, a hydraulic cylinder which is arranged as shown in the drawing may be used for amplifying the braking hydraulic pressure of the first braking hydraulic pressure channel in the event of a failure of the second braking hydraulic pressure channel. In this case, a release fluid chamber H' is provided in the middle shaft part of the power piston 101 independently of the fluid chambers C and A'. The chamber H' is arranged to have the braking hydraulic pressure of the first braking hydraulic pressure channel amplified in the event of a failure of the second braking hydraulic pressure channel by allowing the hydraulic pressure which acts on the fluid chamber C from the fail-safe fluid chamber G' and the hydraulic pressure which acts on the fluid chamber A' from the fail-safe fluid chamber A to overlap each other.

Figure 3:
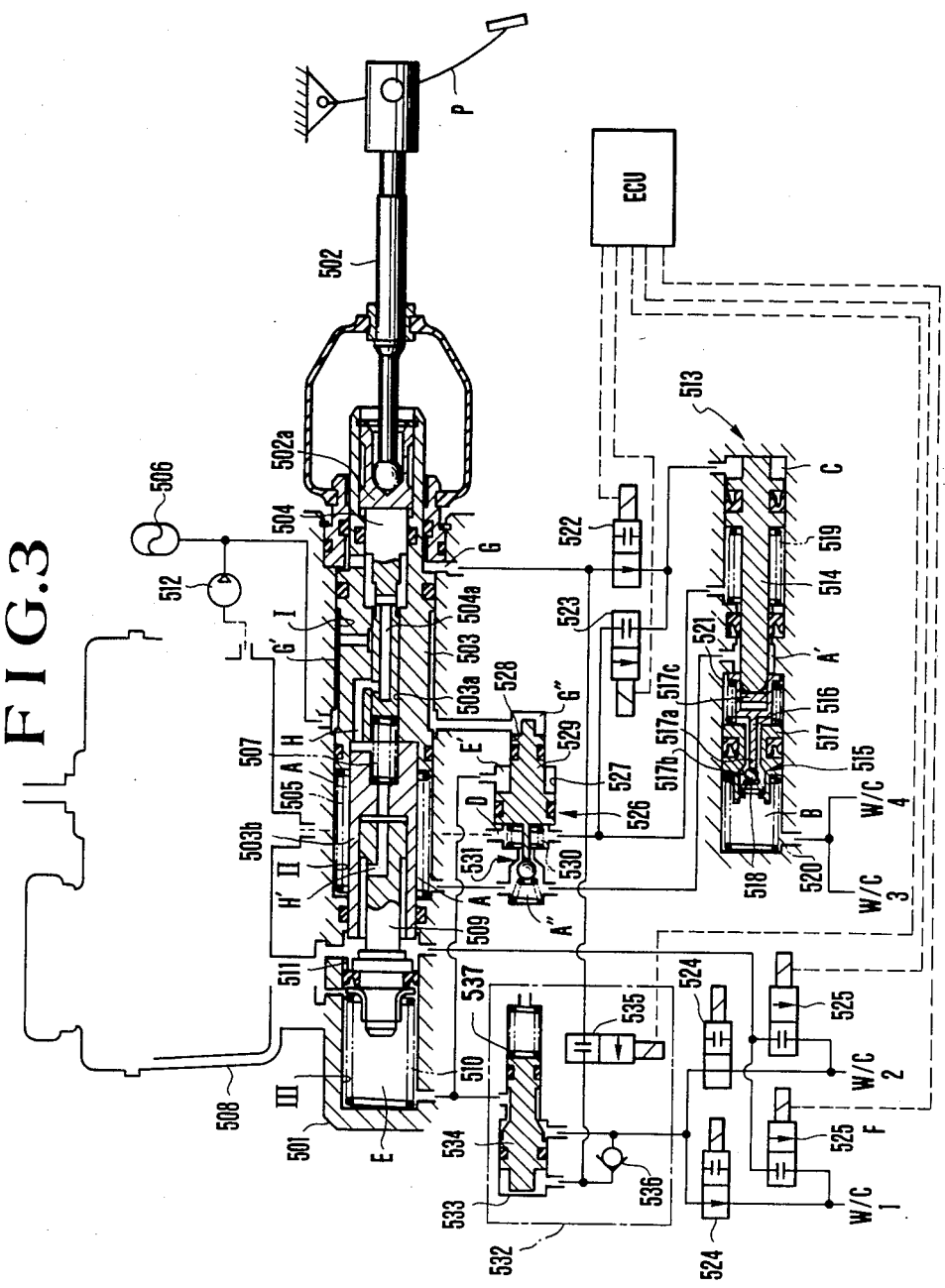
FIG. 3 shows in outline the arrangement of a third embodiment example of this invention.

A third embodiment example of this invention is arranged as described in detail below with reference to FIG. 3:

In the following description, the hydraulic pressure generating device of a second braking hydraulic pressure channel is referred to as a master cylinder device for the sake of convenience: Referring to the drawing, a cylinder body 501 includes a third cylinder III which is arranged to house the master cylinder device; a first cylinder which is arranged in a stepped shape to house a transmission hydraulic pressure control valve device; and a second cylinder II which is arranged in between the first and third cylinders to house a fail-safe hydraulic pressure generating device. These first, second and third cylinders are coaxially arranged.

The inside of the first cylinder I is arranged as follows: A control piston 503 which has some fluid passage suitably formed therein is slidably engaged with the first cylinder. The piston 503 is pushed and biased by a return spring 505 toward an opening provided at the rear end of the first cylinder (right end as viewed on the drawing). The piston 503 is provided with an inner cylinder 503a which is formed within the shaft of the piston. A fluid passage change-over piston 504 is slidably engaged with the inside of the inner cylinder 503a. A push rod 502 engages the rear end of the piston 504 via a ball joint bearing 502a. The push rod 502 is connected at its right end to a brake pedal P. When the brake pedal is stepped down, the rod 502 pushes the change-over piston 504 to move.

The control piston 503 and the change-over piston 504 jointly form a transmission hydraulic pressure control valve device. Under a non-braking condition, the control valve device allows a fluid chamber G and a hydraulic pressure releasing fluid chamber H to communicate with each other via a passage 504a. When a pushing force of the push rod 502 comes to push the change-over piston 504 into the control piston 503, the control valve device blocks the communication between the fluid chambers G and H. In that event, the control valve device allows the fluid chamber G to communicate with another fluid chamber G' which is disposed on the side of a pressure source. In other words, the fluid chamber G' is connected to a pressure accumulator 506.

With the fluid chambers G' and G allowed to communicate with each other, when hydraulic pressure is transmitted to the fluid chamber G, a hydraulic force is exerted on the change-over piston 504 to counteract the pushing force of the push rod 502. Thus, this force comes to act as a reaction force against a pedalling force applied to the brake pedal. Therefore, hydraulic pressure from the fluid chamber G' is transmitted to the fluid chamber G in proportion to the pedalling force on the brake pedal. Then, communication among the fluid chambers G', G and H is blocked under this condition.

The internal arrangement of the first cylinder I described above may be made substantially in accordance with a known hydraulic booster arrangement. Further, the change-over piston 504 is provided with a return spring 507.

Next, the inside of the second cylinder II is arranged as follows: A small diameter piston 503b is press fitted into the fore end (left end as viewed on the drawing) of the control piston 503 to be formed into one body with the latter. A fail-safe fluid chamber A is formed jointly by the control piston 503 which is thus prepared and the second cylinder II which is in a stepped shape. A fail-safe hydraulic pressure generating device is thus obtained.

Further, within the small diameter piston 503b, is formed a pressure fluid passage H'. The above-stated hydraulic pressure releasing fluid chamber H communicates with a reservoir 508 through this passage H'.

The internal arrangement of the third cylinder III is as follows: An ordinary master cylinder type hydraulic pressure generating device is disposed within the third cylinder III. A hydraulic pressure generating piston 509 is arranged to be biased by a return spring 510 to be thus opposed at its rear end to the small diameter piston 503b of the control piston 503 under a non-braking condition. The hydraulic pressure generating piston 509 generates hydraulic pressure within a master cylinder fluid chamber E. The hydraulic pressure thus generated in the fluid chamber E is used as braking hydraulic pressure for a second braking hydraulic pressure channel. A pump 512 is arranged to suck up pressure fluid from the reservoir 508 to the pressure accumulator 506.

In the master cylinder type brake pedal responding arrangement described above, each of the moving members is in the position as shown in the drawing under a non-braking condition. Under that condition, communication is blocked between the fluid chambers G' and G and is allowed among the fluid chambers G and H and the reservoir. Then, no hydraulic pressure is generated in the fail-safe fluid chamber A and the master cylinder fluid chamber E.

At the time of brake application, the communication is blocked between the fluid chambers G and H and is allowed between the fluid chambers G and G'. Then, hydraulic pressure which is proportional to the pedalling force on the brake pedal is transmitted to the inside of the fluid chamber G. Further, within the master cylinder fluid chamber E, there is generated a given amount of hydraulic pressure is generated in proportion to the pedalling force applied to the brake pedal.

The fail-safe fluid chamber A is arranged to have therein a given amount of hydraulic pressure generated in proportion to the pedalling force. However, under a normal condition, no hydraulic pressure is generated due to the action of a switching valve device 502b which will be described later herein.

The hydraulic pressure generated in the master cylinder fluid chamber E as mentioned above is a braking hydraulic pressure for a second braking hydraulic pressure channel. Meanwhile, the braking hydraulic pressure of the first braking hydraulic pressure channel is generated by a proportional hydraulic pressure generating device 513 with the hydraulic pressure of the above-stated fluid chamber G transmitted to the proportional hydraulic pressure generating device 513 which includes therein a power piston.

In this specific embodiment, the proportional hydraulic pressure generating device 513 comprises a power piston 514 which is arranged to generate braking hydraulic pressure required for normal brake application; and a hydraulic pressure piston 517. The piston 517 incorporates therein a switch valve 515 and is arranged to generate a braking hydraulic pressure in cooperation with the power piston 514 for normal brake application and to transmit the hydraulic pressure generated in the fluid chamber A to a braking device in the event of a failure of a normal braking operation.

When the hydraulic pressure from the fluid chamber G is transmitted to a fluid chamber C, the hydraulic pressure of the chamber C acts on the power piston 514 to cause it to move. This in turn imparts a moving force to the hydraulic pressure piston 517. The hydraulic pressure piston 517 is provided with a fluid passage 517a which axially pierces the piston 517. Under a normal condition, the passage is open with a ball 518 kept away from a valve seat 517b by a locking rod 516 which abuts on the ball 518. The fluid passage is closed when the power piston 514 pushes an extension part 517c of the piston 517 to move the piston and when the ball 518 comes into contact with the valve seat with the locking rod 516 disenagaged from the ball as a result of the movement of the piston 517. The switch valve 515 is thus arranged to serve as a check valve within the fulid passage 517a.

The end of the hydraulic pressure piston 517 on the side of the power piston faces a fluid chamber A', which communicates with the above-stated fail-safe fluid chamber A. The opposite end of the hydraulic pressure piston 517 faces a fluid chamber B which communicates with the wheel cylinder W/C of the braking device.

When the hydraulic pressure is transmitted to the fluid chamber C through the above-stated arrangement, the power piston 514 moves to push the hydraulic pressure piston 517. With the piston 517 thus moved, the switch valve 515 closes. After that, braking hydraulic pressure which is proportional to the hydraulic pressure of the chamber C is generated in the fluid chamber B. This braking hydraulic pressure is for the first braking hydraulic pressure system. The embodiment includes return springs 519 and 520; and a hold spring 521 which is provided for the locking rod.

The braking hydraulic pressure system provided within each of the first and second brake channels includes a device to be used for antiskid control. This device is arranged as follows:

In the first braking hydraulic pressure channel, the hydraulic pressure supplying and discharging solenoid valve device consists of a combination of a normally-open type solenoid valve 522 disposed in a passage connecting the fluid chambers G and C and a normally closed type solenoid valve 523 disposed in a passage which is arranged to discharge hydraulic pressure from the inside of the fluid chamber C into the reservoir 508. In the second braking hydraulic pressure channel, the hydraulic pressure supplying and discharging solenoid valve device consists of a combination of normally-open type solenoid valves 524 interposed in between the fluid chamber E and braking devices W/C1 and W/C2 respectively and normally-closed type solenoid valves 525 which are respectively disposed in passages arranged to release the pressure fluid of these braking devices into the reservoir 508.

Each of these normally-open type and normally-closed type solenoid valves is arranged to be opened and losed under the control of an antiskid control circuit ECU for the purpose of decreasing or increasing the hydraulic pressure within the applicable braking device. The control circuit ECU is arranged in a known manner.

In the first braking hydraulic pressure system, a switching valve device 526 is arranged to transmit fail-safe hydraulic pressure to the proportional hydraulic pressure generating device 513. The details of this switching valve device 526 are as follows: The device 526 consists of a stepped piston 529 which slidably engages the insides of stepped cylinders 527 and 528; a set spring 530 which is arranged to push the stepped piston 529 toward fluid chambers E' and G''; and a one-way valve 531 which normally opens to release hydraulic pressure from the fail-safe fluid chamber A into the reservoir via the fluid chamber D. A fluid chamber A'' which is separated from the fluid chamber D by this one-way valve 531 serves as an intermediate fluid chamber and is arranged to allow the fluid chambers A and A' to normally communicate with each other therethrough. The stepped piston of this embodiment serves to close the one-way valve 531 to transmit the hydraulic pressure of the fail-safe fluid chamber A to the above-stated proportional hydraulic pressure generating device when both of fluid chambers E' and G'' have no hydraulic pressure. The fluid chamber E' communicates with the master cylinder fluid chamber E while the fluid chamber G'' communicates with the accumulator via the fluid chamber G'.

The switching valve device which is arranged in this manner releases the fail-safe hydraulic pressure under a normal condition. In the event of a failure of the second braking hydraulic pressure system and that of the accumulator, the switching valve device transmits the fail-safe hydraulic pressure to the braking device of the first braking hydraulic pressure system.

The embodiment includes a gate valve device 532, which is arranged as follows: The gate valve device comprises in combination a normally-open type gate valve 533 which is interposed in between the master cylinder fluid chamber E and solenoid valves 524; a normally-closed type hydraulic pressure introducing solenoid valve 535 which is arranged to cause the control hydraulic pressure of the fluid chamber G to act on a piston 534 for closing a fluid passage; and a one-way valve 536 which is arranged to transmit introduced hydraulic pressure only to the braking device. Under a normal condition, the piston 534 is biased to its initial position to open the fluid passage by a resilient force of a set spring 537. In case that the hydraulic pressure introducing valve 535 comes to open the fluid passage in response to an instruction for starting antiskid control, the piston 534 closes the hydraulic passage. The second braking hydraulic pressure channel is thus arranged to perform a braking operation by transmitting the hydraulic pressure of the master cylinder fluid chamber E during normal brake application. At the start of antiskid control, the gate valve 533 closes as the hydraulic pressure introducing valve 535 opens. With the gate valve 533 thus closed, no variations take place within the master cylinder fluid chamber E. Therefore, the braking hydraulic pressure can be reduced or increased as necessary by the operation of the solenoid valves 524 on the downstream side of the gate valve 533.

The antiskid control device which is combined with the hydraulic booster in accordance with the arrangement of this embodiment example described above operates as follows: In the case of normal brake application, a braking hydraulic pressure is generated in the first braking hydraulic pressure channel by the power piston 514 of the proportional hydraulic pressure generating device 513 depending on the hydraulic pressure of the fluid chamber G. Meanwhile, in the second braking hydraulic pressure channel, braking hydraulic pressure is generated in the master cylinder fluid chamber E. The hydraulic pressure thus generated in the first and second channels is transmitted to applicable braking devices respectiely.

During antiskid control, in the first braking hydraulic pressure channel, the solenoid valves 522 and 523 perform switching operations to reduce, hold and increase the braking hydraulic pressure for antiskid control. In the second braking hydraulic pressure channel, the gate valve 533 of the gate valve device 532 first closes to block communication between the master cylinder fluid chamber E and the braking device. Following this, antiskid control is accomplished on the braking hydraulic pressure with the solenoid valves 524 and 525 opened and closed as necessary by utilizing hydraulic pressure introduced from the fluid chamber G.

In the event of a failure of the second braking hydraulic pressure channel and the hydraulic booster the embodiment operates as follows: If the pressure accumulator of the first braking hydraulic pressure channel fails, no hydraulic pressure is generated within the proportional control hydraulic pressure device 513 as no hydraulic pressure is transmitted to the fluid chamber C. In this instance, however, the one-way valve 531 closes at the switching valve device 526. Then, the fail-safe hydraulic pressure generated within the fail-safe hydraulic pressure generating device is transmitted to the fluid chamber A'. Therefore, the fail-safe hydraulic pressure is secured in the first braking hydraulic pressure channel.

If the braking device of the first braking hydraulic pressure channel fails, the second braking hydraulic pressure channel has braking pressure generated and transitted in the same manner as under the normal condition. Further, since the pressure accumulator is operating in a normal manner, the antiskid control is accomplished in the same manner as under the normal condition.

In the event of a failure of the second braking hydraulic pressure channel, braking pressure can be generated and transmitted in a normal manner in the first braking hydraulic pressure channel during normal brake application. In performing antiskid control, the failure of the second braking hydraulic pressure channel is detected by suitable detecting means, such as a combination of a pressure switch and a brake pedalling detection switch or the like. Following that, a shifting operation of the hydraulic pressure introducing solenoid valve 535 of the gate valve device 532 from a closed position to an open position thereof is cancelled. Then, in the first braking hydraulic pressure channel, antiskid control can be accomplished in the same manner as under the normal condition. Further, even if the hydraulic pressure of the fluid chamber G, i.e. that of the pressure accumulator 506, comes to leak, the vehicle can be saved from coming into a state of having absolutely no braking force available.

This invention is not limited to the specific embodiment described. Various modifications and changes may be made in the arrangement of the components involved without departing from the spirit of this invention. For example, the gate valve of the gate valve device may be replaced with a solenoid valve. The arrangement of the switching valve may be changed to transmit the hydraulic pressure of the fail-safe fluid chamber A to the fluid chamber A' only in the event of disappearance of hydraulic pressure either from the master cylinder fluid chamber E or the pressure accumulator.

The hydraulic booster type hydraulic pressure generating device having two independent braking hydraulic pressure channels arranged according to this invention as described in the foregoing is capable of providing braking hydraulic pressure obtained from the fail-safe hydraulic pressure separately arranged to be available either from one of two channels or from the other in the event of a failure of one of the channels. Therefore, the invented arrangement ensures a braking force required for the whole vehicle to enhance the safety of the vehicle.

Further, in the event of a failure of one channel, an excessive pedalling stroke due to a decreased pedal reaction resulting from the failure can be prevented from arising at the brake pedal by virtue of a pedal reaction force obtained from hydraulic pressure generated at the fail-safe fluid chamber. Therefore, the vehicle operator can be saved from being panicked by any abnormal pedalling feeling.

Further the brake system having the antiskid control device combined with the hydraulic booster according to this invention, as described in the foregoing, permits simplification of structural arrangement by virtue of the unification of the above-stated two main components of the system. In addition to that advantage, the fail-safe advantage is enhanced by the interrelated arrangement of the two braking hydraulic pressure channels. The utility of the invention is very great.

What is claimed is:

1. A brake system having a hydraulic booster type braking hydraulic pressure generator, comprising:
   a hydraulic pressure control device arranged to control the hydraulic pressure of a first brake channel of a hydraulic pressure source, said control depending on a pedalling force exerted on a brake pedal;
   a hydraulic pressure generating device arranged to generate the hydraulic pressure of a second brake channel which is proportional to the hydraulic pressure of said first brake channel;
   a fail-safe fluid chamber which is arranged to be capable of generating fail-safe hydraulic pressure in response to the motion of a piston depending on the pedalling force exerted on said brake pedal;
   a switch valve device which is interposed in between said fail-safe fluid chamber and a reservoir and is arranged to be open while receiving the hydraulic pressure of said first brake channel during brake application;
   a hydraulic cylinder device arranged to generate braking hydraulic pressure of said first brake channel by means of either the hydraulic pressure generated at said fail-safe fluid chamber or the hydraulic pressure of said hydraulic pressure control device;
   said switch valve device is arranged to receive the hydraulic pressure of both said first and second brake channels and to close when either of said brake channels fails;
   said switch valve device is provided with a switching piston which is arranged to receive the hydraulic pressure of said second brake channel at one end thereof and to include a valve device therein and a locking rod piston which is arranged to receive the hydraulic pressure of said first brake channel; and
   said switch valve device is arranged to open said valve device when the locking rod piston comes to abut on said valve device.

2. A brake system having a hydraulic booster type braking hydraulic pressure generator, comprising:
   a hydraulic pressure control device arranged to control the hydraulic pressure of a first brake channel of a hydraulic pressure source, said control depending on a pedalling force exerted on a brake pedal;
   a hydraulic pressure generating device arranged to generate the hydraulic pressure of a second brake channel which is proportional to the hydraulic pressure of said first brake channel;
   a fail-safe fluid chamber which is arranged to be capable of generating fail-safe hydraulic pressure in response to the motion of a piston depending on the pedalling force exerted on said brake pedal;
   a switch valve device which is interposed in between said fail-safe fluid chamber and a reservoir and is arranged to be open while receiving the hydraulic pressure of said first brake channel during brake application;
   a hydraulic cylinder device arranged to generate braking hydraulic pressure of said first brake channel by means of either the hydraulic pressure generated at said fail-safe fluid chamber or the hydraulic pressure of said hydraulic pressure control device;

said switch valve device is provided with a stepped piston which is arranged to receive the hydraulic pressure of both said first and second brake channels and a valve device which is arranged to open when said stepped piston abuts thereon; and said valve device closes when both of said brake channels fail.

3. A system according to claim 2, wherein said stepped piston is arranged to receive the hydraulic pressure of said hydraulic pressure source directly from said source.

4. A system according to claim 1 or 2, wherein said hydraulic cylinder device includes: a power piston which is arranged to receive at its one end hydraulic pressure produced from said hydraulic pressure control device; a hydraulic piston which has one end thereof engaging the other end of said power piston; an output chamber which is formed at the other end of said hydraulic piston and communicates with the braking device of said first brake channel; a passage which is arranged in said hydraulic piston to allow said output chamber and said fail-safe fluid chamber to communicate with each other; and a shut-off valve which closes said passage when said power piston is moved toward said output chamber by hydraulic pressure applied to one end of said power piston.

5. A system according to claim 1 or 2 further comprising a first valve of a normally-open type which is disposed in between the output side of said hydraulic pressure control device and an input chamber formed at one end of said power piston; and a second valve which is disposed in between said input chamber and a reservoir, said first and second valves being arranged to be controlled by a signal produced from a control circuit which is arranged to detect a skidding state of the wheels of a vehicle.

* * * * *